United States Patent
Karonde et al.

(10) Patent No.: US 9,483,357 B2
(45) Date of Patent: Nov. 1, 2016

(54) SELECTIVE RESTORE FROM INCREMENTAL BLOCK LEVEL BACKUP

(75) Inventors: Pratap Karonde, Holbrook, NY (US); Prashant Parikh, Holtsville, NY (US)

(73) Assignee: CA, Inc., New York, NY (US)

(*) Notice: Subject to any disclaimer, the term of this patent is extended or adjusted under 35 U.S.C. 154(b) by 706 days.

(21) Appl. No.: 12/941,180

(22) Filed: Nov. 8, 2010

(65) Prior Publication Data

US 2012/0117342 A1    May 10, 2012

(51) Int. Cl.
*G06F 11/14* (2006.01)

(52) U.S. Cl.
CPC ....... *G06F 11/1451* (2013.01); *G06F 11/1458* (2013.01); *G06F 11/1469* (2013.01); *G06F 2201/815* (2013.01)

(58) Field of Classification Search
CPC ........... G06F 11/1451; G06F 11/1458; G06F 11/1469
See application file for complete search history.

(56) References Cited

U.S. PATENT DOCUMENTS

| | | | |
|---|---|---|---|
| 7,366,859 B2 | 4/2008 | Per et al. | |
| 7,370,164 B1 | 5/2008 | Nagarkar et al. | |
| 8,209,680 B1 * | 6/2012 | Le et al. | 717/174 |
| 2004/0268068 A1 | 12/2004 | Curran et al. | |

* cited by examiner

*Primary Examiner* — Eric S Cardwell
(74) *Attorney, Agent, or Firm* — Gilliam IP PLLC

(57) ABSTRACT

A computer implemented method includes creating a child disk for a machine. A configuration of a backed up disk drive is derived from a storage container that includes a block level backup copy of the disk drive. The child disk is populated with selected data from blocks of data corresponding to selected files desired to be used on the machine. Drivers may be injected and registries modified to start with booting of the virtual.

16 Claims, 11 Drawing Sheets

SELECTIVE RESTORE FROM INCREMENTAL BLOCK LEVEL BACKUP

BACKGROUND

After a block level backup of a hard disk we end up with a backup that consists of information about each block on source disk. With just this information we do not have any understanding of files/folders/applications that are present on the Hard disk and the only way of restoring this data is by performing full hard disk restore. However, in most of the cases, the users want to just restore some set of files/folders and not the entire disk. This is one of the major disadvantages of block level backup that is hampering widespread adaption of this type of backup.

SUMMARY

A computer implemented method includes creating a child disk for a machine. A configuration of a backed up disk drive is derived from a storage container that includes a block level backup copy of the disk drive. The child disk is populated with selected data from blocks of data corresponding to selected files desired to be used on the machine.

A machine readable storage device includes code for causing a computer to create a child disk for a machine. A configuration of a backed up disk drive is derived from a storage container that includes a block level backup copy of the disk drive. The child disk is populated with selected data from blocks of data corresponding to selected files desired to be used on the machine.

In a further embodiment, the above methods are implemented by one or more modules of a backup system implemented on a computer system.

DETAILED DESCRIPTION

Figure 1:
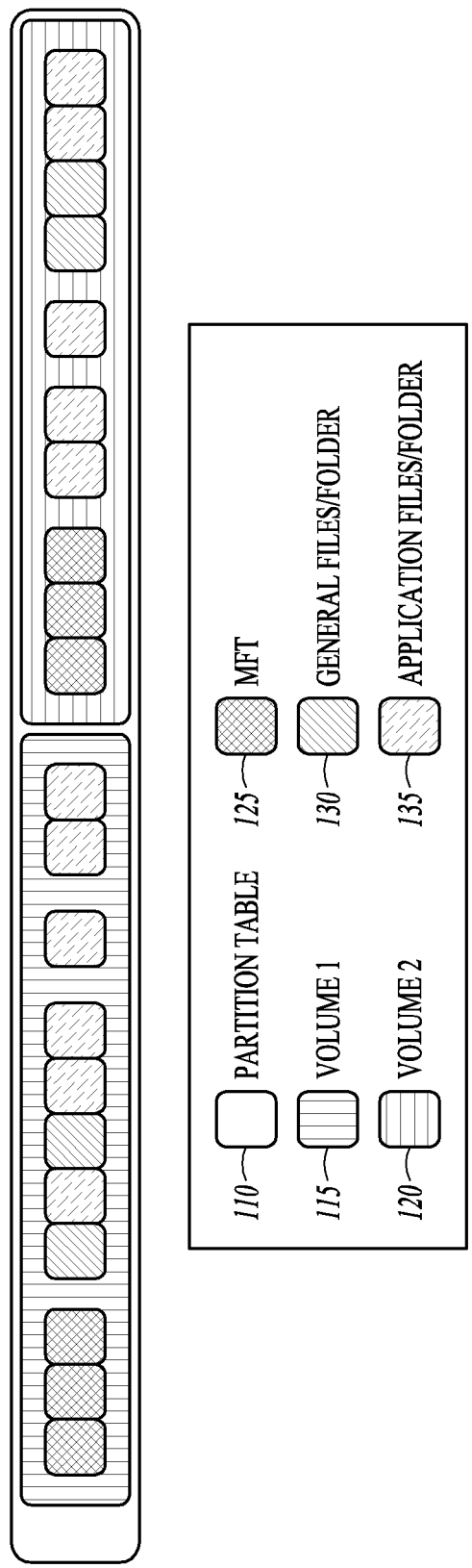
FIG. 1 is a block diagram of a block backup format according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

In block level backups, blocks of a source machine are stored in a virtual hard disk container. Such a container provides an exact replica of a source physical disk available in a virtual format. While the term "exact replica" is used, the exact formatting of the blocks of data in the container may be quite different from the format of the source physical disk, but the blocks are logically related and may serve as an exact replica. The container may be referred to as a virtual hard disk. If for some reason the physical machine has some outage (planned or un-planned), the virtual hard disk may be used to start a machine, such as a single computer or virtual machine equivalent of the physical machine so that the applications that were working on the physical machine will continue to work from the virtual machine.

In one embodiment, a computer implemented method is used to obtain different types of restores from a single block level backup. One type of restore that may be provided is a file/folder restore. Applications may also be restored. Further, a physical to virtual restore may be done to provide for high availability.

When a block level backup of a source hard disk is performed, an equivalent virtual hard disk is created on a destination storage, such as virtual hard disks. These virtual hard disks have exactly the same layout as information stored on the source hard disk, but as described above, their physical layout is likely different in the storage container. In one embodiment, this virtual hard disk may be opened, and the sectors read out of it. On a typical hard disk there exists a partition table that describes the number and location of different partitions on that disk. The position and structure of this partition table is well documented and can be used by the computer implemented method to identify partitions and volumes on the virtual hard disks.

FIG. 1 illustrates the contents 100 in block diagram form of a block level backup. A partition table is indicated at 110, with a first volume 115 and a second volume 120. First volume 115 includes Master File Table (MFT) blocks 125, general files and folders indicated at 130 and application files and folders indicated at 135. The second volume 120 also contains MFT blocks 125, general files and folders indicated at 130, and application files and folders indicated at 135.

Once access to the volume on the disk is obtained, the volume is parsed to find locations and extents of files on the volume. For example, if the volume is of type NTFS, the volume header is read to find out the location and extent of MFT on the volume. The MFT file holds information about the size, location, etc of all the files and folders present on the hard disk. The computer implemented method, that may be instantiated in a computer program stored on a storage device, can cause a computer executing the program to read this MFT file, parse its contents and generate a catalog that has information about the files, their locations and blocks used by those files. This information can be used to provide individual file restore from a block level backup.

In one embodiment, Microsoft VSS Technology may be used to obtain a block level backup of source disks that contains application data in a consistent manner. When such a backup is fully restored back to the disk, an application should start without any loss of data. When VSS backup is performed, VSS also identifies which set of files on the disk are actually part of that application and should be restored to obtain application consistent restore. This information is used to support application restore from block level backup.

Thus, as described above, a single block level backup can be used to not only perform a full machine restore but also to perform file/folder restore and also application restores.

Also since a virtual hard disk equivalent of source machine is available, the virtual hard disks may be used to start another virtual machine equivalent of source machine. In further embodiments, the block level backup may be used to create some other virtual format, such as by performing bare metal recover, so that different virtual formats may be supported.

Figure 2:
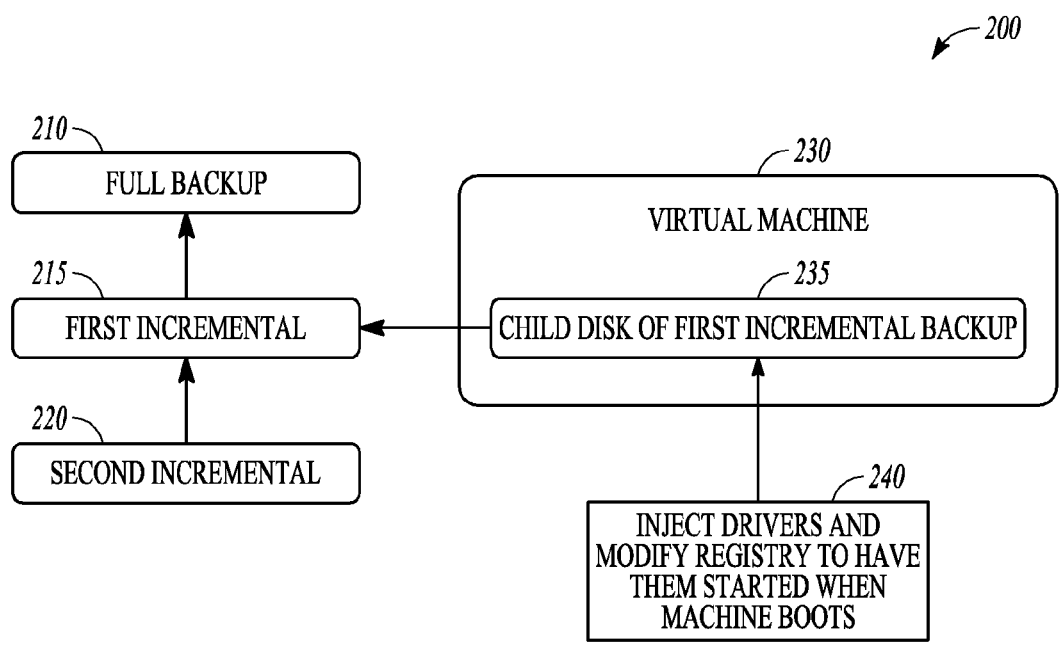
FIG. 2 is a block diagram illustrating forming a virtual disk from an incremental backup according to an example embodiment.

In one example, as illustrated in FIG. 2 at 200, a full sync or block level backup 210 is followed by a couple of incremental syncs, first incremental sync 215 and second incremental sync 220. If a user wants to start a new machine or virtual machine VM 230 based on data at a first sync, a computer implemented method uses the first incremental backup as source and creates another child disk at 235 to start the VM. At 240, drivers may be injected, and a registry modified to have them started when the virtual machine boots. The creation of an additional child disk prevents the corruption of the first incremental disk when the VM starts, thereby maintaining validity of the second incremental backup.

Since there is likely a change in some hardware between a physical machine and a virtual machine, some changes in the configuration files of physical machine may be made to the backup to adopt it for the virtual machine. Most of these changes are done in either registry of backup or injection of new drivers into the virtual disks. The changes are done in one embodiment by mounting the virtual hard disks in read-write mode and using standard methods to make registry changes and driver injection.

In addition to all the advantages of block level incremental backup (backup of only changed blocks, frequent incremental backups, etc.), the described backup method enables the performance of restores of individual files/folders and applications from the same backup. A user is not restricted to always performing a full machine restore just to recover a few files or one of many applications from the source machine. In some embodiments, the backup provides high availability capability for a source physical machine by allowing for creation of a virtual machine equivalent of a source machine.

Various embodiments of incremental block level backups that may be used with the backup method are now described. Further types of block level backups may also be used in further embodiments.

Figure 3:
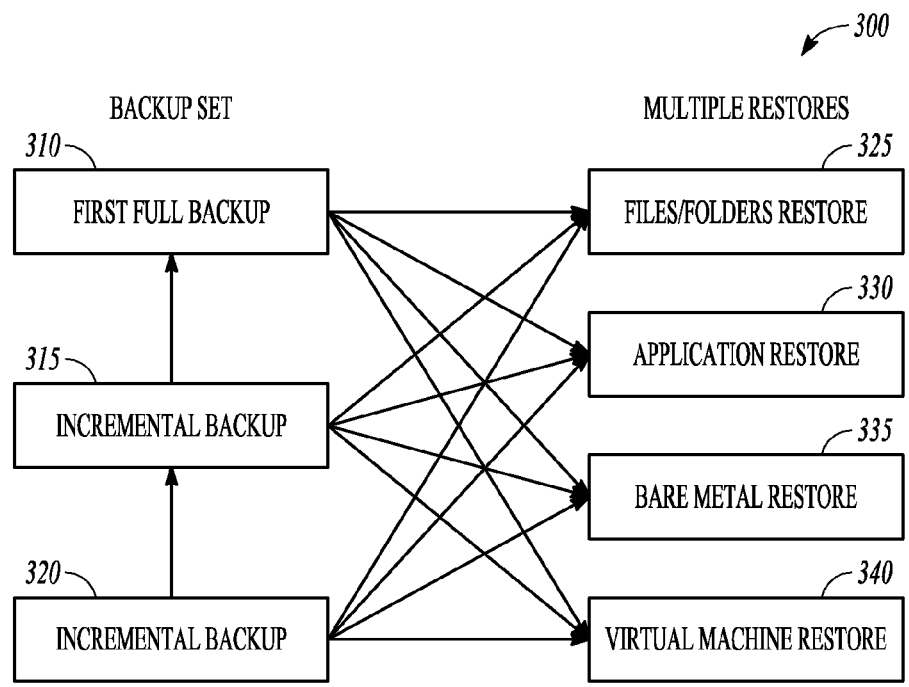
FIG. 3 is a block diagram illustrating different types of restores from block level backups according to an example embodiment.

FIG. 3 is a block diagram 300 illustrating multiple different types of restores that may be performed from block level backups, including incremental backups. Incremental backups are described further below. Different types of block level backups are illustrated at 310, 315, and 320, with backup 310 being a full backup of a disk drive, and 315 and 320 referring to incremental backups, where only changed blocks following the immediately previous backup are stored. Different types of restores include files/folders resotre 325, application restore 330, bare metal restore 335 and virtual machine restore 340. Further details on these restores are provided below.

Figure 4:
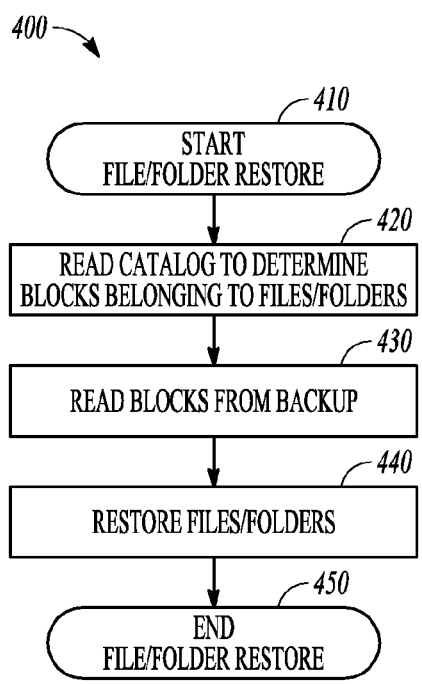
FIG. 4 is a flowchart illustrating a method corresponding to restoring files and folders according to an example embodiment.

FIG. 4 is a flowchart describing a method 400 corresponding to restoring files and folders. At 410, the restore starts. A catalog is read at 420 to determine blocks belonging to the files and folders. Blocks from the backup are read at 430. If an incremental backup is used, previous incremental backups and the full restore may also be used to read the latest blocks needed for the restore. At 40, the files and folders are restored onto a child drive. The restores ends at 450.

Figure 5:
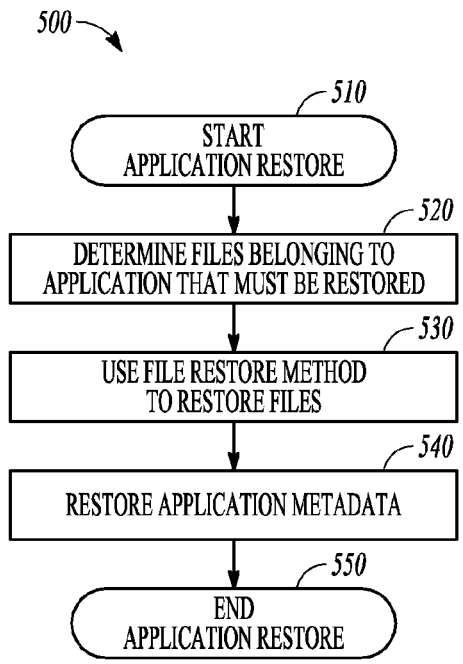
FIG. 5 is a flowchart illustrating a method corresponding to an application restore according to an example embodiment.

FIG. 5 is a flowchart describing a method 500 corresponding to an application restore. The method starts at 510, and files belonging to the application that is to be restored are determined at 520. At 530, the file restore method may be used to restore the files. Application metadata is restored at 540, and the method ends at 550. As before, one or more block level restores may be used to restore application.

Figure 6:
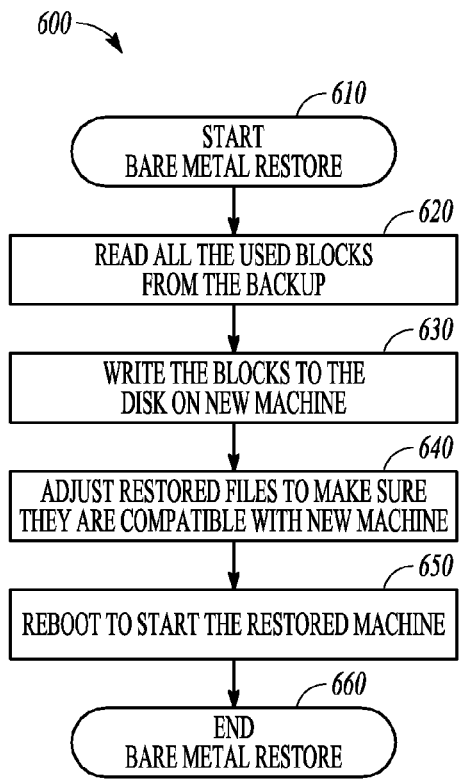
FIG. 6 is a flowchart illustrating a method of a bare metal restore according to an example embodiment.

FIG. 6 is a flowchart describing a method 600 corresponding to a bare metal restore, which starts at 610. At 620, all the used blocks from one or more backups are read. The blocks are written to a child disk on a new machine at 630. At 640, the restored files may be adjusted to make sure they are compatible with the new machine. The machine is then rebooted at 650 to start the restored machine, and the bare metal restore method ends at 660.

Figure 7:
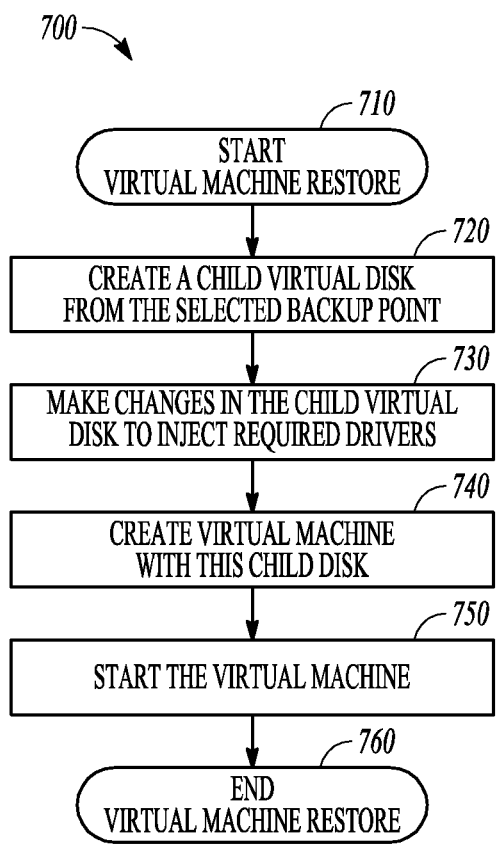
FIG. 7 is a flowchart illustrating a method of a virtual machine restore according to an example embodiment.

FIG. 7 illustrates a method 700 of a virtual machine restore starting at 710. At 720, a child virtual disk is created from a selected backup point. The creation of the child virtual disk may involve one or more incremental backups and a full level backup in one embodiment. At 730, changes in the child virtual disk are made to inject required drivers. A virtual machine is then created with the child virtual disk at 740. At 750, the virtual machine is started, and the virtual machine restore method ends at 760.

Figure 8:
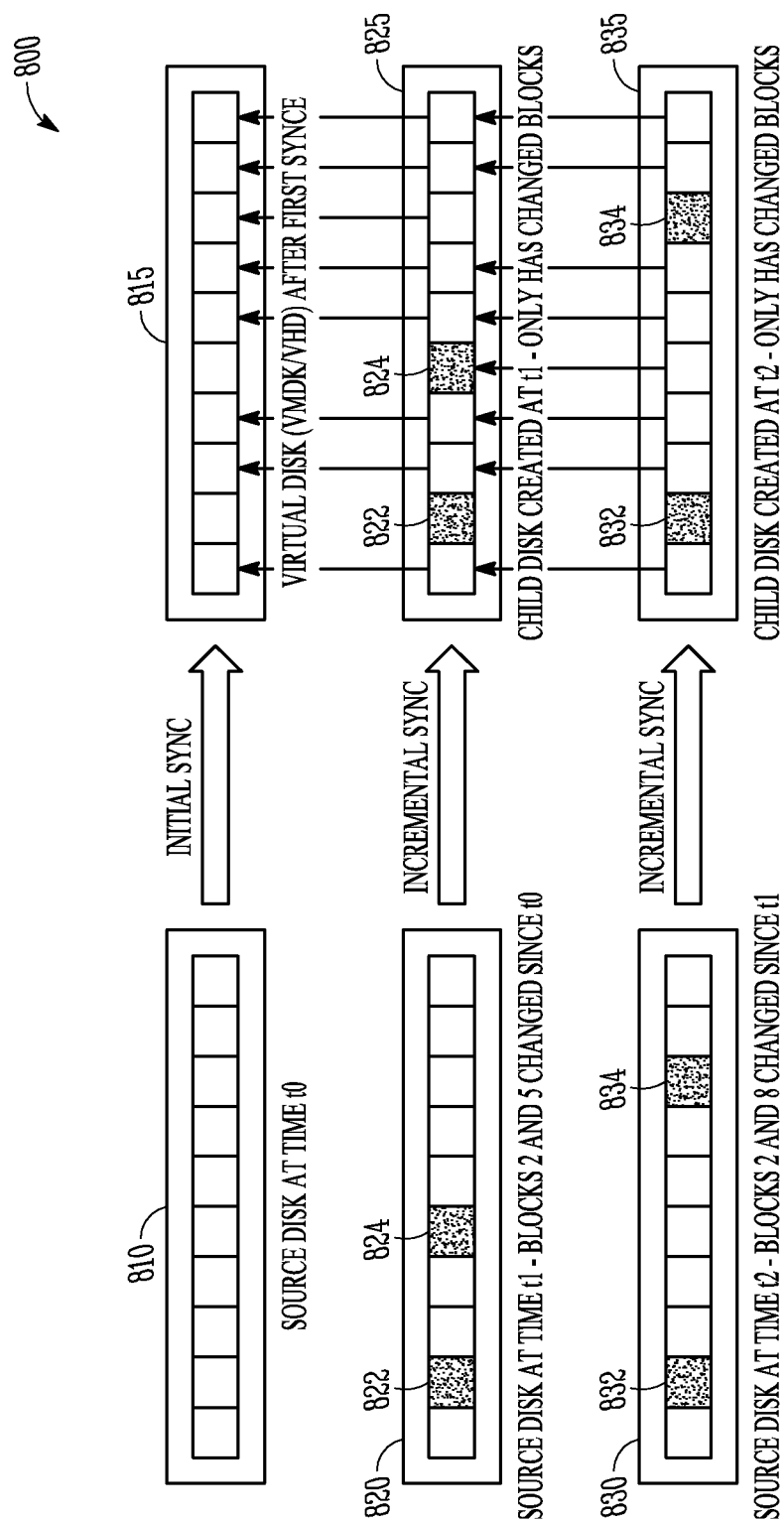
FIG. 8 is a diagram illustrating multiple backups of selected data over time according to an example embodiment.

FIG. 8 is a diagram illustrating at 800, multiple backups of selected data over time according to an example embodiment. A bock representation of a data storage device at a time T0 is indicated at 810. Ten blocks are show as representing data stored on the data storage device 810. In one embodiment, data stored on the storage device 810 is broken into blocks as shown. Portions of the storage device 810 that do not currently have data need not have a corresponding block. An initial full backup of the blocks is performed and results in a backup copy 815 of the blocks, which may be stored on a virtual disk, or any other type of container or storage device, such as a disk drive. All ten blocks are stored in full backup copy 815. The initial backup may be referred to as an initial sync in one embodiment.

At a time T1, storage device 810 may be modified as shown at 820. Blocks 822 and 824, the second and fifth blocks may be changed from time T0. An incremental sync or backup is then performed, resulting in blocks 822 and 824 being stored as indicated at incremental backup 825. The same container or storage device used for backup copy 815 may also be used for incremental backups. The remaining blocks need not be stored in incremental backup 825, because they remain the same as stored in full backup copy 815.

At a time T2, more blocks of storage device 810 may have been modified as shown at 830. Blocks 832 and 834, corresponding to the second and eighth blocks have been modified. The second block was modified both by times T1 and T2. Both blocks 832 and 834 are stored in a further incremental backup 835. The other, unmodified blocks need not stored in incremental backup 835. Note that several blocks have not been modified yet, and are thus not included in the incremental backups 825 and 835. Many more incremental backups may be performed at set times or as otherwise desired.

At some point, to reduce the number of incremental backups that must be processed to recover data, the two oldest backups, 815 and 825 may be merged. This results in block 822 in backup 825 being stored over the second block in backup 815, and block 824 in backup 825 being stored over the fifth block in backup 815. The overall number of backups is reduced by as a result of the merge, making recovery shorter, as fewer backups need to be processed to recover data.

Figure 9:
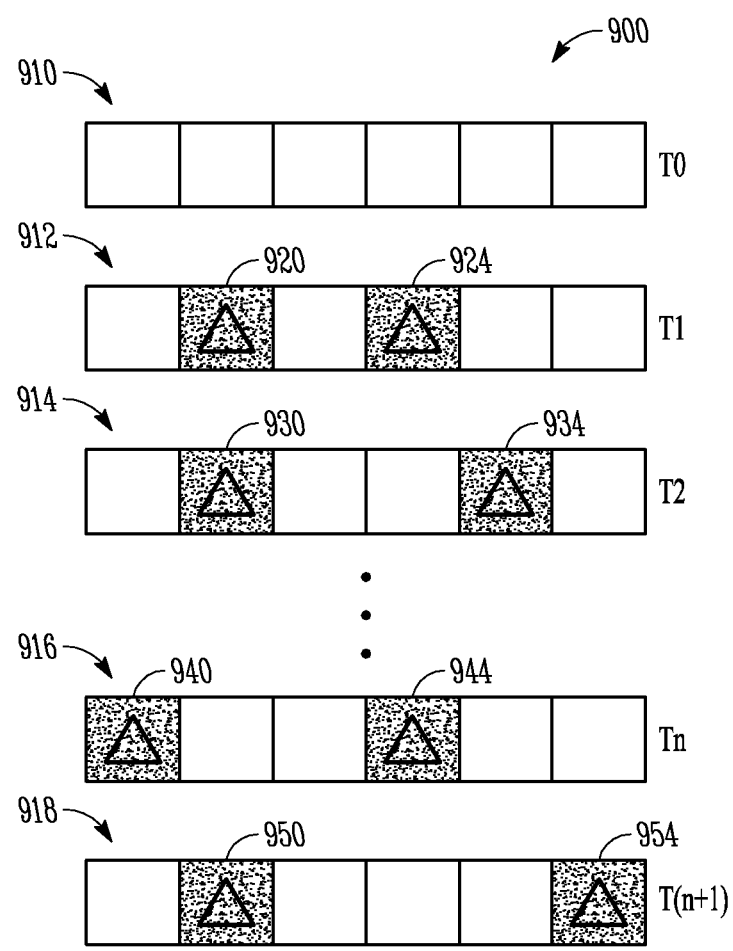
FIG. 9 is a block diagram illustrating multiple incremental backups over time according to an example embodiment.

FIG. 9 is a diagram illustrating at 900, multiple backups of selected data over time according to an example embodiment. A bock representation of a full backup of blocks of data storage device at a time T0 is indicated at 910, and successive incremental backups are shown at 912 for time T1, 914 for time T2, 916 for time Tn, and 918 for time T(n+1). In one embodiment, only changed blocks in the incremental backups are saved. The changed blocks are indicated at 920 and 924 for incremental backup 512, 530 and 534 for incremental backup 914, 940 and 944 for incremental backup 916, and 950 and 954 for incremental backup 918.

In one embodiment, n incremental backups are kept. When incremental backup 918 is made or is scheduled to be made, the changed blocks 920 and 924 of incremental backup 912 are merged into the full backup 910, replacing corresponding blocks. The merging of the two oldest backups, 910 and 912 ensure that at most only n backups need be merged to recover data prior to a next backup. When incremental backup at time T(n+2) is to be performed, incremental backup 914 from time T2 may be merged into full backup 910, maintaining the number of backups at n. This process may continue ad infinitum, without the need to make a second full backup, saving storage space, and recovery time.

As one example, consider that the storage device needs to be recovered after time T(n+1). With the previous merger of incremental backup 912, only n backups need to be processed to recover data that had been stored on the storage device. At time T(n+m), the mergers reduce by m the number of backups to be processed to recover the data. Over time, m, can be very large, such as 1000 or more if backups are scheduled periodically. In some embodiments, scheduled backups may be set by users, and may be performed several times week, day or hour as desired, resulting in very large numbers of incremental backups if merges are not performed. However, mergers help keep the number of backups to be processed to recover data to a manageable number.

In some embodiments, rather than a fixed number, n, of incremental backups being kept, backups may instead be merged based on time periods. For instance, a user may desire to keep all incremental backups for a period of a week, or some other user selected period. Rather than merging the oldest two backups, intermediate incremental backups may be merged, such as to merge daily backups into weekly backups that may be kept for a longer period of time. Regardless of the incremental backup rate, incremental backups may be merged when they are older than the selected period. They may be merged in batch, so that they may occur at slow periods, such as late evenings or early mornings in one embodiment, or individually as the selected period for each incremental backup is past.

Figure 10:
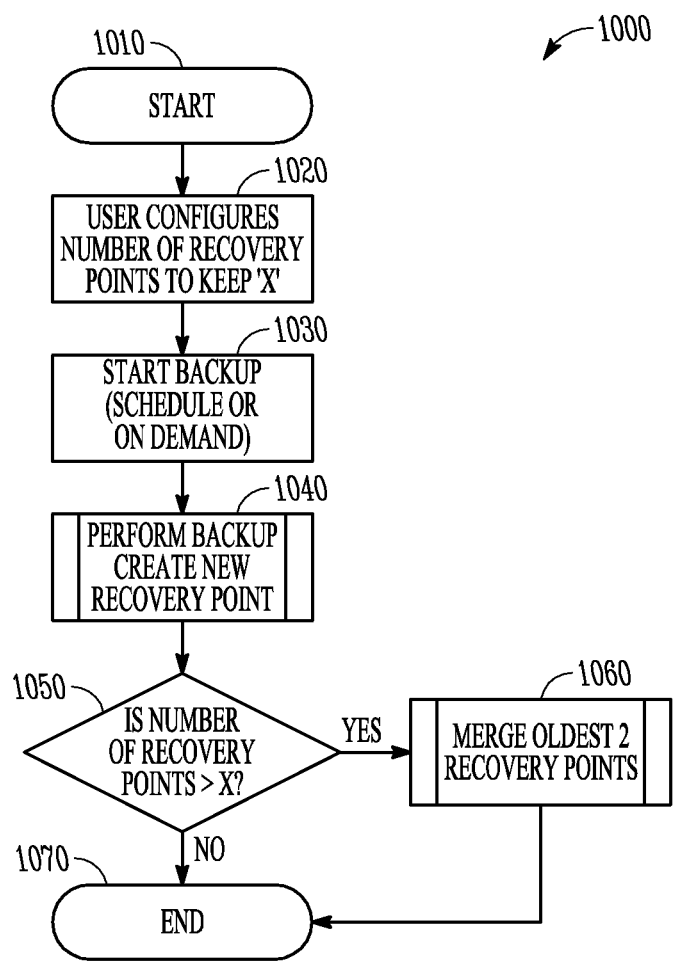
FIG. 10 is a flowchart illustrating a computer implemented process for backing up data according to an example embodiment.

FIG. 10 is a flowchart illustrating a computer implemented process 1000 for backing up data. At 1010, the process 1000 starts. The process may be set up on a new computer system or an older computer system, and operates to backup data stored on one or more storage devices to allow users to recover data that may be lost due to equipment failure or other event leading to data loss.

At 1020, a user configures the number of recovery points, x, to keep. The number may be a default number set by a manufacturer, or may be selected to allow recovery to selected points within a desired time frame, such as a few days or weeks, or even minutes depending on the frequency of backups and the application being implemented by the computer system. Once the number of recovery points is selected backups may be started as indicated at 1030. Backups may be scheduled periodically, or on demand, or a combination of both.

At 1040, a backup is performed, creating a new recovery point. The initial backup is referred to as the oldest recovery point, with subsequent backups being referred to as incremental recovery points. At 1050, the number of recovery points is checked to see if it is greater than x. If so, the oldest two recovery points are merged at 1060, creating an updated oldest recovery point. The process 1000 ends at 1070.

Figure 11:
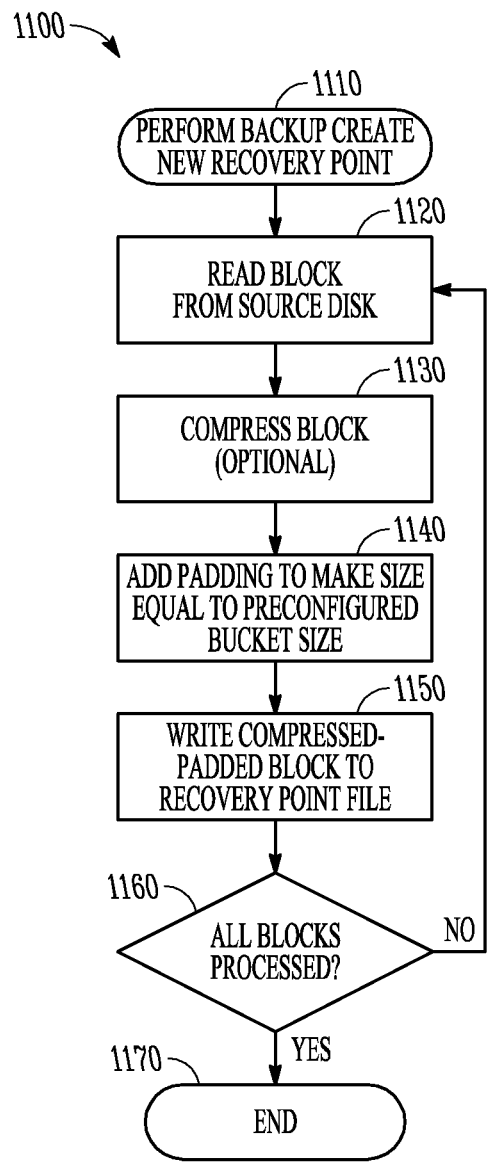
FIG. 11 is a flowchart illustrating a process of creating a new or first recovery point according to an example embodiment.

FIG. 11 is a flowchart illustrating a process 1100 of creating a new or first recovery point. At 1110, a backup is initiated to create a new recovery point. At 1120, a block from a source storage device, such as a disk of a disk drive device is read. At 1130, the block may be optionally compressed. At 1140, some padding is added to the block to make the size of the block equal to a preconfigured bucket size or one of several preconfigured sizes. At 1150, the padded block, or padded compressed block is written to a recovery point file on a backup storage system, such as different disk drives, tape drives, optical, or other type of storage. At 1160, it is determined whether all the blocks have been processed. If not, the next block is read at 1120, and the process 1100 continues. If all blocks have been processed, process 1100 ends at 1170.

Figure 12:
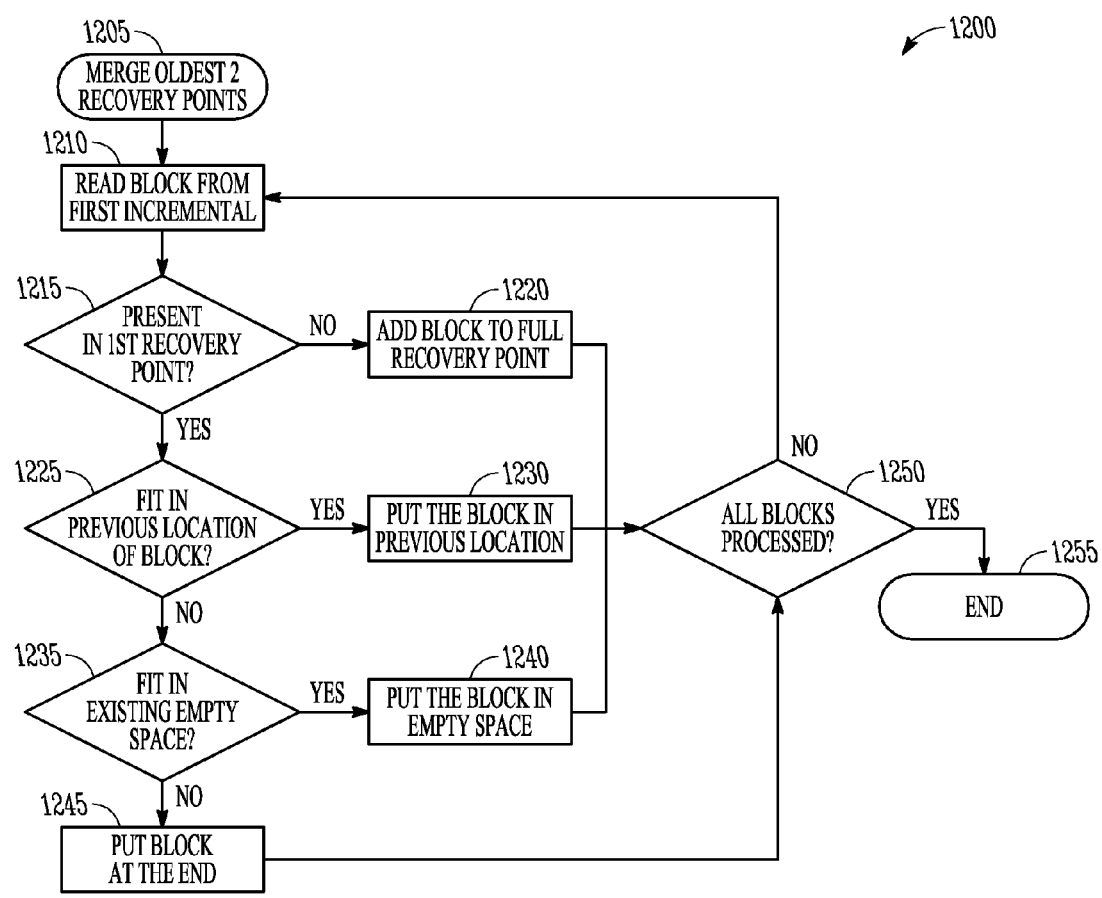
FIG. 12 is a flowchart illustrating a process for merging recovery points according to an example embodiment.

FIG. 12 is a flowchart illustrating a process 1200 for merging recovery points. At 1205, the process to merge the oldest two recovery points begins. At 1210, a block is read from the first incremental recovery point. At 1215, a check is made to see if the read block is present in the oldest, first recovery point. If not, the read block is added to a full recovery point at 1220. If the read block was present, a check is made at 1225 to determine if the read block will fit in the previous location of the block in the first recovery point. The padding provides some buffer to increase the likelihood that the read block will fit, even if the data in the block has been significantly changed. If it will fit, the block is put into the previous location at 1230, if not, a check is made to see if the read block will fit in existing empty space at 1235. If the block will fit in existing empty space, the block is put into the empty space at 1240. If not, the block may be added to the end of the recovery point at 1245. After the read block is stored at 1220, 1230, or 1240, a check is made to see if all blocks have been processed at 1250. If not, the merger process proceeds at 1210 by reading a next block. If all blocks have been processed, the merge process 1200 ends at 1255.

In the embodiment shown in FIG. 9, a hardware and operating environment is provided that is applicable to any of the servers and/or remote clients shown in the other Figures.

Figure 13:
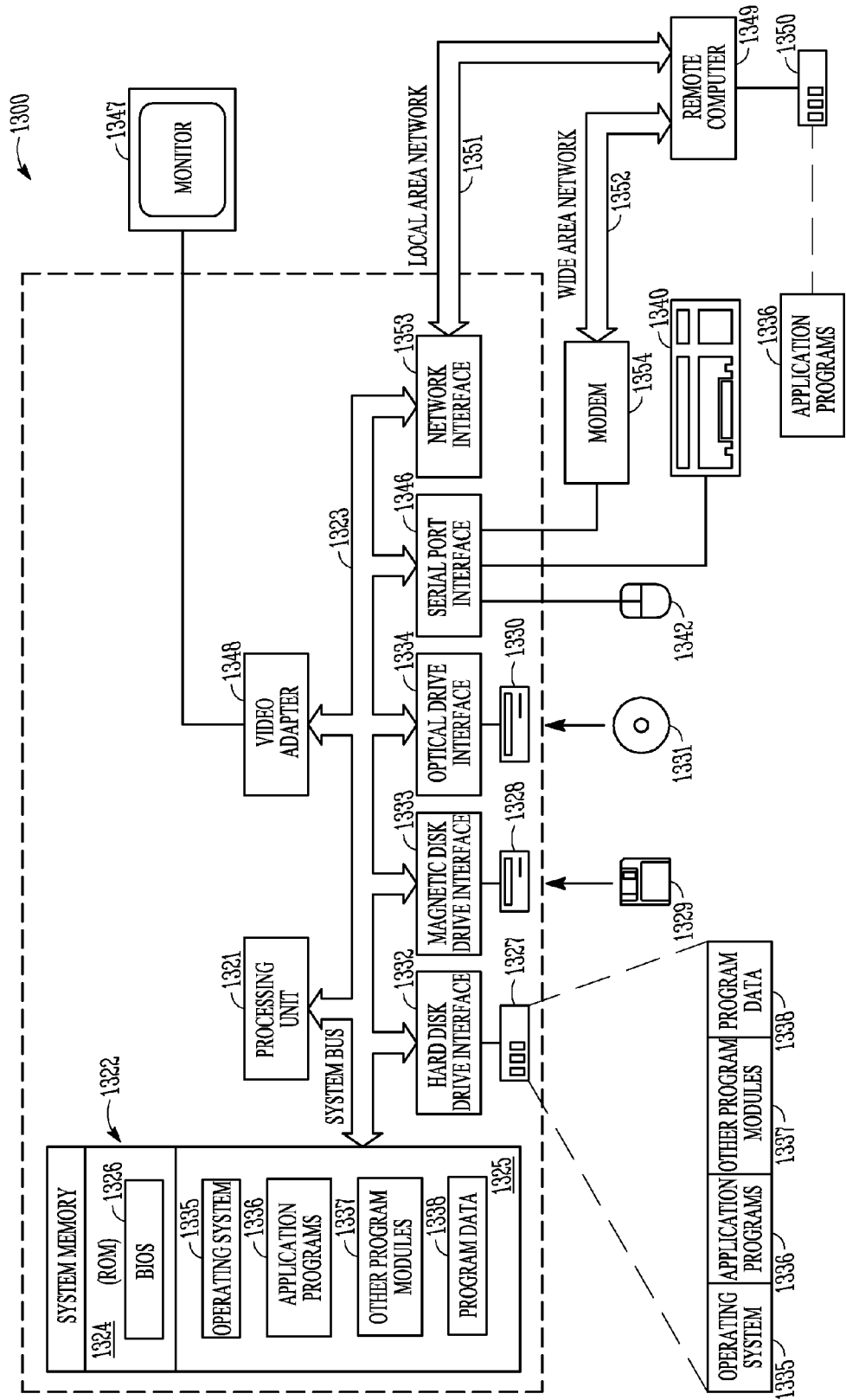
FIG. 13 is a block diagram illustrating a computer system for implementing and full backup and multiple incremental backups according to an example embodiment.

As shown in FIG. 13, one embodiment of the hardware and operating environment includes a general purpose computing device in the form of a computer 1300 (e.g., a personal computer, workstation, or server), including one or more processing units 1321, a system memory 1322, and a system bus 1323 that operatively couples various system components including the system memory 1322 to the processing unit 1321. There may be only one or there may be more than one processing unit 1321, such that the processor of computer 1300 comprises a single central-processing unit (CPU), or a plurality of processing units, commonly referred to as a multiprocessor or parallel-processor environment. In various embodiments, computer 1300 is a conventional computer, a distributed computer, or any other type of computer.

The system bus 1323 can be any of several types of bus structures including a memory bus or memory controller, a peripheral bus, and a local bus using any of a variety of bus architectures. The system memory can also be referred to as simply the memory, and, in some embodiments, includes read-only memory (ROM) 1324 and random-access memory (RAM) 1325. A basic input/output system (BIOS) program 1326, containing the basic routines that help to transfer information between elements within the computer 1300, such as during start-up, may be stored in ROM 1324. The computer 1300 further includes a hard disk drive 1327 for reading from and writing to a hard disk, not shown, a magnetic disk drive 1329 for reading from or writing to a removable magnetic disk 1329, and an optical disk drive 1330 for reading from or writing to a removable optical disk 1331 such as a CD ROM or other optical media.

The hard disk drive 1327, magnetic disk drive 1328, and optical disk drive 1330 couple with a hard disk drive interface 1332, a magnetic disk drive interface 1333, and an optical disk drive interface 1334, respectively. The drives and their associated computer-readable media provide non volatile storage of computer-readable instructions, data structures, program modules and other data for the computer 1300. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 1329, optical disk 1331, ROM 1324, or RAM 1325, including an operating system 1335, one or more application programs 1336, other program modules 1337, and program data 1338. Programming for implementing one or more processes or method described herein may be resident on any one or number of these computer-readable media.

A user may enter commands and information into computer 1300 through input devices such as a keyboard 1340 and pointing device 1342. Other input devices (not shown) can include a microphone, joystick, game pad, satellite dish, scanner, or the like. These other input devices are often connected to the processing unit 1321 through a serial port interface 1346 that is coupled to the system bus 1323, but can be connected by other interfaces, such as a parallel port, game port, or a universal serial bus (USB). A monitor 1347 or other type of display device can also be connected to the system bus 1323 via an interface, such as a video adapter 1348. The monitor 1347 can display a graphical user interface for the user. In addition to the monitor 1347, computers typically include other peripheral output devices (not shown), such as speakers and printers.

The computer 1300 may operate in a networked environment using logical connections to one or more remote computers or servers, such as remote computer 1349. These logical connections are achieved by a communication device coupled to or a part of the computer 1300; the invention is not limited to a particular type of communications device. The remote computer 1349 can be another computer, a server, a router, a network PC, a client, a peer device or other common network node, and typically includes many or all of the elements described above I/O relative to the computer 1300, although only a memory storage device 1350 has been illustrated. The logical connections depicted in FIG. 13 include a local area network (LAN) 1351 and/or a wide area network (WAN) 1352. Such networking environments are commonplace in office networks, enterprise-wide computer networks, intranets and the internet, which are all types of networks.

When used in a LAN-networking environment, the computer 1300 is connected to the LAN 1351 through a network interface or adapter 1353, which is one type of communications device. In some embodiments, when used in a WAN-networking environment, the computer 1300 typically includes a modem 1354 (another type of communications device) or any other type of communications device, e.g., a wireless transceiver, for establishing communications over the wide-area network 1352, such as the internet. The modem 1354, which may be internal or external, is connected to the system bus 1323 via the serial port interface 1346. In a networked environment, program modules depicted relative to the computer 1300 can be stored in the remote memory storage device 1350 of remote computer, or server 1349. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

The Abstract is provided to comply with 37 C.F.R. §1.72(b) is submitted with the understanding that it will not be used to interpret or limit the scope or meaning of the claims.

The invention claimed is:

1. A computer implemented method comprising:
    based on a request to start a first machine based on a first incremental block level backup on a first child disk with selective restore of at least one of a file, folder, or an application, creating a second child disk of the first incremental block level backup, wherein creating the second child disk comprises,
  determining, with a catalog generated from master file table blocks, blocks of the first incremental block level backup and a set of one or more preceding block level backups that form the at least one of a file, a folder, or an application;
  populating the second child disk with at least the determined blocks;
injecting drivers into the second child disk and modifying a registry in the second child disk; and
booting the first machine with the second child disk.

2. The method of claim 1 further comprising:
identifying a second incremental block level backup and a third incremental block level backup; and
merging the second incremental block level backup with the third incremental block level backup to generate the first incremental block level backup.

3. The method of claim 2 further comprising determining that either a number of incremental backups has been created or a time period has expired, wherein the second and third incremental block level backups are merged based, at least in part, on the determination that either a number of incremental backups has been created or a time period has expired.

4. The method of claim 1 wherein the second child disk comprises a virtual disk and the method claim 1 further comprises mounting the second child disk in read-write mode to modify the registry or to inject the drivers.

5. The method of claim 1 wherein a block level backup upon which the first incremental block level backup depends includes partition table information.

6. The method of claim 5 wherein the partition table information provides partition and volume information to create the second child disk with a same layout as a backed up disk drive.

7. The method of claim 1, wherein the first machine is a virtual machine and the first incremental block level backup comprises backup data for a physical machine, wherein the drivers and modification of the registry correspond to configuration differences between the physical machine and the virtual machine.

8. The method of claim 1 further comprising:
determining files and folders of an application selected for restore,
wherein determining the blocks comprises determining, with the catalog, the blocks that form the files and folders of the application.

9. A non-transitory machine readable storage device having instructions stored thereon, the instructions to:
based on a request to start a first machine based on a first incremental block level backup on a first child disk with selective restore of at least one of a file, folder, or an application, create a second child disk of the first incremental block level backup, wherein the instructions to create the second child disk comprise instructions to,
  determine, with a catalog generated from master file table blocks, blocks of the first incremental block level backup and a set of one or more preceding block level backups that form the at least one of a file, a folder, or an application;
  populate the second child disk with at least the determined blocks;
inject drivers into the second child disk and modify a registry in the second child disk; and
boot the first machine with the second child disk.

10. The non-transitory machine readable storage device of claim 9 further having instructions to,
identify a second incremental block level backup and a third incremental block level backup; and
merge the second incremental block level backup and the third incremental block level backup to generate the first incremental block level backup.

11. The non-transitory machine readable storage device of claim 9, wherein the second child disk comprises a virtual disks and the non-transitory machine readable storage device further comprises instructions to:
mount the second child disks in read-write mode to modify the registry and inject the drivers.

12. The non-transitory machine readable storage device of claim 9, wherein the first machine is a virtual machine and the first incremental block level backup comprises backup data for a physical machine, wherein the drivers and modification of the registry correspond to configuration differences between the physical machine and the virtual machine.

13. The non-transitory machine readable storage device of claim 9 further having instructions to:
determine files and folders of an application selected for restore,
wherein the instructions to determine the blocks comprise instructions to determine, with the catalog, the blocks that form the files and folders of the application.

14. A backup system comprising:
a processor; and
a machine readable storage device having instructions stored therein, the instructions executable by the processor to cause the backup system to,
based on a request to start a first machine based on a first incremental block level backup on a first child disk with selective restore of at least one of a file, folder, or an application, create a second child disk of the first incremental block level backup, wherein the instructions to create the second child disk comprise instructions to,
  determine, with a catalog generated from master file table blocks, blocks of the first incremental block level backup and a set of one or more preceding block level backups that form the at least one of a file, a folder, or an application;
  populate the second child disk with at least the determined blocks;
inject drivers into the second child disk and modify a registry in the second child disk; and
boot the first machine with the second child disk.

15. The backup system of claim 14, wherein the first machine is a virtual machine and the first incremental block level backup comprises backup data for a physical machine, wherein the drivers and modification of the registry correspond to configuration differences between the physical machine and the virtual machine.

16. The backup system of claim 14, wherein the machine readable storage device further has instructions executable by the processor to cause the backup system to:
determine files and folders of an application selected for restore,
wherein the instructions to determine the blocks comprise instructions to determine, with the catalog, the blocks that form the files and folders of the application.

* * * * *